3,270,671
CARTRIDGE WAD AND PROCESS FOR THE MANUFACTURE THEREOF
Benjamin K. Daubenspeck and Edward A. Rickey, Stratford, Conn., assignors to Remington Arms Company, Inc., Bridgeport, Conn., a corporation of Delaware
No Drawing. Filed Apr. 29, 1965, Ser. No. 452,007
7 Claims. (Cl. 102—95)

This application is a continuation-in-part of copending application Serial Number 211,108, filed July 19, 1962, now abandoned.

This invention relates, in general, to shot shell wads, and, particularly to an improved combination of materials for wads.

An object of the invention is to provide an improved cartridge wad which is practical and economical to produce.

Another object of the invention is to provide an improved molded cartridge wad having fire and explosion resisting characteristics.

Other objects will be apparent from reading the specification and the appended claims.

The following discussion will refer mostly to the manufacture of molded basewads. However, it must be appreciated that the discussion is not intended to be limited to basewads only.

Although there are various processes of making basewads, most basewads which are made today are made by either a convolute wound process whereby a strip of paper is wound continuously to form the wad or a wet process whereby the wads are molded from a fibrous slurry. One of the main disadvantages of the wet process, however, is that the wads made by this process are variable and difficult to control. The wound basewad, on the other hand, is more expensive and has a serious deficiency in that its gas-sealing properties are poor. Some manufacturers of wound basewads find it necessary to place an overlay over the wound basewads to seal the gas. This dual construction, however, is more expensive and has functional problems in that the overlay is not adequately fastened and sometimes comes loose in firing the shell. A leaking basewad is objectionable because of its hard extraction, especially with steel or aluminum heads and poor reloading characteristics.

The gas-sealing ability of the present dry-mix cold-molded basewads is in itself an important improvement in the art.

In the present new process, low cost fibrous materials are blended dry, and adhesive material is added, and the completed dry free-flowing mix is molded directly into wads with no further treatment required.

Various combinations of bindable fibrous materials were tried in order to find a combination of materials which would have the necessary physical characteristics which would permit the dry-mixed material to be molded directly into the completed wad in one step. In addition to the characteristics which would permit molding, the mixture also had to have sufficient strength and other physical characteristics to be used as a shot shell basewad.

It was found that asbestos, not previously used in basewads construction, had the necessary characteristics which permitted its use in this process. First of all, asbestos flows readily so that it can be controlled to plus or minus 5 grains—an important consideration in basewads where the weight must be carefully regulated. Secondly, asbestos is readily compressible so that in a short molding time, air is removed and the wad will hold its dimensions. Furthermore, asbestos has good strength qualities, is a natural binder, is cheap and available, and is stable in heat, moisture, or corrosive atmospheres. Finally, asbestos is a well-known non-combustible and chemically resistant mineral. Asbestos dust, when added to wood dust, retards explosion and burning.

Varying compositions of asbestos were mixed with varying quantities of wood flour, "Silvacon" (bark fibre), and wood fiber with varying quantities of binder to successfully make basewads by using the dry molding process. An important consideration in limiting the amount of asbestos is the weight factor since various functional problems including shell ejection are encountered when too great a quantity of relatively heavy asbestos is used.

In general, it was found that all ligneous cellulose materials are suitable for use as filler materials with asbestos fibers. Such synthetic materials as plastic flour (phenolics), cellulose acetate, polyvinyl alcohol, and polyvinyl acetate also can be prepared in fibrous form and used as filler material with asbestos and still be compatible with the wax binders.

It was found that microcrystalline wax or paraffin or blends of both with an additive to add strength and resiliency thereto (e.g. butyl rubber) could satisfactorily be used as a binder, the exact composition depending on the product desired and the manufacturing circumstances involved. Thus, microcrystalline wax is very plastic at about 100° F. and is a source of some manufacturing problems at this temperature. Paraffin wax is hard and brittle and may exhibit some objectionable fracturing characteristics on firing. The ultimate, of course, is to find a formula which has the best compressibility characteristics and which is not sensitive to manufacturing conditions.

In general, a wax binder would be suitable if the melting point was not substantially lower than about 120° F. and not substantially greater than about 200° F. (ASTM Test D127–49) and if its hardness or needle penetration was between about 5 to about 100 tenths of a millimeter at 77° F. and under a 100 gram load (ASTM Test D1321–57T).

A preferred composition which can be utilized in making basewads by the cold-dry molding process comprises about:

40% asbestos;
60% wood fiber;
8% of microcrystalline wax by weight of the above mixture of asbestos and wood fiber.

However, it must be appreciated that the preferred percentages are not limiting in the exercise of the present invention. For example, basewads can be produced of 100% asbestos plus binder or 100% wood fiber plus binder. Obviously, at these extremes, it will be necessary to sacrifice various physical characteristics which may make the wads unacceptable for various types of shot-shell use. It has been found that acceptable basewads for most general uses can be produced by varying the asbestos not substantially less than 30% and not substantially more than 60%. Conversely, the wood fiber or whatever other filler material is used can be varied from not substantially less than 40% and not substantially more than 70%. Finally, the binder, e.g., microcrystalline wax, can be present in an amount equal to 5–15% of the weight of the bindable fibrous materials.

*Process*

Assuming that the fibrous bindable material is to be the preferred mixture, i.e., asbestos and wood fiber, this mixture is blended in a ribbon mixer and the mixture is heated to a temperature of about 120° F.–200° F., although the preferred range is about 180° F.–200° F. Molten microcrystalline wax or a blend thereof is then sprayed on the hot fibrous mixture and the mixture and binder blended. It is possible to add the binder with the original fibers, but spraying the molten adhesive on the pre-blended fibers appears to give a more uniform mixture.

As mentioned above, the preferred range to which the fibrous mixture is heated is about 180° F.–200° F. However, the mixture can be heated above 200° F. with a corresponding result that more moisture is driven out of the mixture, which moisture must be replaced before the final molding of the wad. The temperature is kept low to keep as much inherent water in the fibers as possible.

After blending the heated fibrous mixture and the molten wax binder, the mixture is cooled and moisture added to bring the moisture content to the original content of the fibers (4 to 6½% wet basis). If the moisture is not brought up to the original content, the final wad will take on moisture from the air and swell. If there is too much moisture in the mixture the final wad will give off the excess moisture and shrinking will result. The mixture can be cooled at room temperature or by feeding the mixture to a cooler. Also, the moisture content can be raised or lowered as circumstances require.

From the cooler, the mixture goes to a storage hopper and then to feeders which feed the cooled-dry mix to the tableting or compressing machine where the mix is individually apportioned and molded at pressures ranging from 10,000 to 40,000 pounds per square inch.

It is possible to mold the basewads without cooling the blended mixture of fibrous material and wax binder. However, the hotter the material, the more difficult it is to produce a physically strong basewad which can stand the material handling of the wads after they come from the tableting machine. The strength obtained in cooling the mixture prior to tableting aids materially in the handling of the wads after they are ejected from the tableting machine.

A slightly modified process utilizes the addition of calcium resinate to the wax or wax blend in order to permit the use of higher percentages of wax (and wax blends) binders without altering the obturating characteristics of the basewad and without sacrificing rigidity and strength. The modified process is useful to cut down on the amount of "dusting" which occurs when basewads made according to the original process are used. With the higher wax content, greatly improved moisture resistance is obtained as well as increased resistance to erosion and splitting tendencies of a dry mold basewad. It is believed that the calcium resinate improves the binding properties of the wax (adhesion and tensile strength) without inducing brittleness.

Assuming that the fibers to be used in the modified process are asbestos and wood fibers, the mixture is blended in a ribbon mixer and heated to a temperature of about 120° F.–200° F., although the preferred range is about 180° F.–200° F. After several minutes mixing or at such time that the asbestos and wood fibers have been thoroughly mixed, precipitated calcium resinate is added and the mixing continued to produce a homogeneous blend. The percentage of precipitated calcium resinate added is determined by the properties desired in the molded basewad. In the present example where the asbestos-wood fiber ratio is about 40–60, the calcium resinate addition is equal to about 4–5% of the total weight of the asbestos-wood fiber blend.

To the above mixture, a molten binder, preferably a blend of microcrystalline wax and paraffin wax is sprayed on to the mixture of fibers and calcium resinate. The percentage of wax blend used depends on the properties desired in the molded basewad and in the present example is equal to about 15–20% of the total weight of the asbestos-wood fiber mixture. After all the ingredients have been mixed at a temperature of about 180° F.–200° F. and thoroughly blended, the batch is transferred to another ribbon mixer where it is cooled and sufficient water added to bring the moisture content to about 4–6½ percent.

As in the first process, in general all ligneous cellulose materials are suitable as filler materials with asbestos fibers. Such synthetic materials as plastic flour (phenolics); cellulose acetate; polyvinyl alcohol; and polyvinyl acetate also can be prepared in fibrous form and used as filler material.

What is claimed is:

1. In a shotshell cartridge wherein a basewad is positioned at the rear end thereof, said basewad comprising an individually molded structure coherent under firing conditions and consisting essentially of a mixture of 30–60% of asbestos fibers and 70–40% of wood fibers held together by a wax binder means to form a compact mass of sufficient density and strength to prevent gas leakage and rupture upon firing.

2. In a shotshell cartridge as described in claim 1 wherein said wax binder means consists essentially of a mixture of microcrystalline wax, paraffin wax, and an additive added to the wax to add strength and resiliency thereto.

3. In a shotshell catridge as described in claim 2 wherein said additive is butyl rubber and wherein said wax is present in an amount equal to 5–15% of the weight of said fiber mixture.

4. A cartridge basewad comprising an individually molded structure coherent under firing conditions and consisting essentially of a mixture of asbestos fibers and at least one other filler material which can be easily and uniformly coated with a binder, said other filler material selected from the group of low density, fibrous materials consisting of ligneous cellulose fibers, plastic flour (phenolics) when in fiber form, cellulose acetate fibers, polyvinyl alcohol fibers, and polyvinyl acetate fibers, said asbestos and said other filler material being held together by a binder to form a compact mass of sufficient density and strength to prevent gas leakage and rupture upon firing, said binder having a melting point between about 120° F. to about 200° F. and a needle penetration index of between 5 to 100 tenths of a millimeter (at 77° F. and 100 gram load according to ASTM Test D1321–57T).

5. A cartridge basewood as recited in claim 4 wherein said binder comprises a blend of microcrystalline wax, paraffin wax, and calcium resinate.

6. A cartridge basewood as recited in claim 5 wherein said binder is present in an amount equal to about 15–20% of the weight of the unblended mixture.

7. A cartridge wad consisting essentially of an individually cold-molded mixture of 30–60% of asbestos fibers, 70–40% of lignous cellulose fibers, and a wax binder present in an amount equal to about 15–20% of the weight of the fibers, said wax binder having a melting point between 120° F. to 200° F. and a needle penetration index of between 5 to 100 tenths of a millimeter (at 77° F., 100 gram load according to ASTM Test D1321–57T) and including calcium resinate equal to about 4–5% of the weight of the blended fibers.

References Cited by the Examiner

UNITED STATES PATENTS

| | | | |
|---|---|---|---|
| 126,615 | 5/1872 | Wood | 102—95 |
| 128,231 | 6/1872 | Lovett | 102—95 |
| 1,771,898 | 7/1930 | O'Neil et al. | 102—44 |
| 2,827,666 | 3/1958 | Wagner | 264—128 |
| 3,141,814 | 7/1964 | Schultz | 162—155 |
| 3,184,373 | 5/1965 | Arledter | 162—155 |
| 3,188,369 | 6/1965 | Guthrie | 264—128 |

BENJAMIN A. BORCHELT, *Primary Examiner.*

R. F. STAHL, *Assistant Examiner.*